US011740807B2

(12) United States Patent
Chopra et al.

(10) Patent No.: US 11,740,807 B2
(45) Date of Patent: Aug. 29, 2023

(54) METHOD AND SYSTEM FOR MAPPING DATA PROTECTION POLICIES TO DATA CLUSTERS

(71) Applicant: EMC IP Holding Company LLC, Hopkinton, MA (US)

(72) Inventors: Shelesh Chopra, Bangalore (IN); Mohammed Abdul Samad, Bangalore (IN); Krishna TN, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/494,499

(22) Filed: Oct. 5, 2021

(65) Prior Publication Data
US 2023/0108321 A1    Apr. 6, 2023

(51) Int. Cl.
*G06F 3/06* (2006.01)
(52) U.S. Cl.
CPC .......... *G06F 3/0622* (2013.01); *G06F 3/0604* (2013.01); *G06F 3/067* (2013.01); *G06F 3/0629* (2013.01); *G06F 3/0659* (2013.01)
(58) Field of Classification Search
None
See application file for complete search history.

(56) References Cited

U.S. PATENT DOCUMENTS

| | | | |
|---|---|---|---|
| 9,275,060 B1* | 3/2016 | Supekar | G06F 16/185 |
| 9,600,376 B1* | 3/2017 | Krinke, II | G06F 11/1456 |
| 10,365,977 B1* | 7/2019 | Gould | G06F 11/2094 |
| 10,893,111 B1 | 1/2021 | Ezra et al. | |
| 10,896,097 B1* | 1/2021 | Purcell | G06F 11/1451 |
| 11,036,419 B1* | 6/2021 | Srikantan | G06F 3/065 |
| 2012/0095968 A1 | 4/2012 | Gold | |
| 2012/0166395 A1 | 6/2012 | Kaijima et al. | |

(Continued)

FOREIGN PATENT DOCUMENTS

CN    114153822 A    3/2022

OTHER PUBLICATIONS

VMware, Inc., Backup and Restore, VMware Validated Design 6.0.1, Aug. 25, 2020.

*Primary Examiner* — Edward J Dudek, Jr.
*Assistant Examiner* — Ralph A Verderamo, III
(74) *Attorney, Agent, or Firm* — Chamberlain, Hrdlicka, White, Williams & Aughtry

(57) ABSTRACT

Techniques described herein relate to a method for managing data protection services for data clusters. The method includes identifying, by a mapping module of a data protection manager, a first discovery event associated with a first data cluster; in response to identifying the first discovery event: obtaining first data cluster topology information associated with the first data cluster from the first data cluster; obtaining data cluster data protection information from a data cluster data protection information repository; mapping first protection policies to the first data cluster using the first data cluster topology information and the data cluster data protection information; updating data cluster topology information protection policy mappings using the using the first data cluster topology information and the data cluster data protection information; and initiating performance of first data protection services for the first data cluster based on the first mapped protection policies.

20 Claims, 10 Drawing Sheets

(56) References Cited

U.S. PATENT DOCUMENTS

| | | | |
|---|---|---|---|
| 2013/0254402 A1 | 9/2013 | Vibhor et al. | |
| 2013/0346532 A1* | 12/2013 | D'Amato | G06F 3/0635 |
| | | | 709/213 |
| 2015/0149423 A1* | 5/2015 | Kiselev | G06F 3/067 |
| | | | 707/694 |
| 2015/0356161 A1* | 12/2015 | Slavfcek | G06F 16/27 |
| | | | 707/636 |
| 2016/0070487 A1 | 3/2016 | Crawford et al. | |
| 2016/0078245 A1 | 3/2016 | Amarendran et al. | |
| 2016/0357736 A1 | 12/2016 | Schuenzel et al. | |
| 2017/0026263 A1* | 1/2017 | Gell | H04L 67/1023 |
| 2017/0083251 A1* | 3/2017 | Karale | G06F 3/067 |
| 2019/0332496 A1 | 10/2019 | Chopra | |
| 2020/0042619 A1* | 2/2020 | Venkataramani | G06F 16/1844 |
| 2020/0293193 A1 | 9/2020 | Littlefield et al. | |
| 2020/0333985 A1* | 10/2020 | Farrahi Moghaddam | |
| | | | G06F 3/0635 |
| 2021/0034571 A1 | 2/2021 | Bedadala et al. | |
| 2021/0132846 A1* | 5/2021 | Moldvai | G06F 3/0671 |
| 2021/0303164 A1* | 9/2021 | Grunwald | G06F 3/0629 |
| 2021/0400568 A1* | 12/2021 | Chaysinh | H04L 65/1016 |

\* cited by examiner

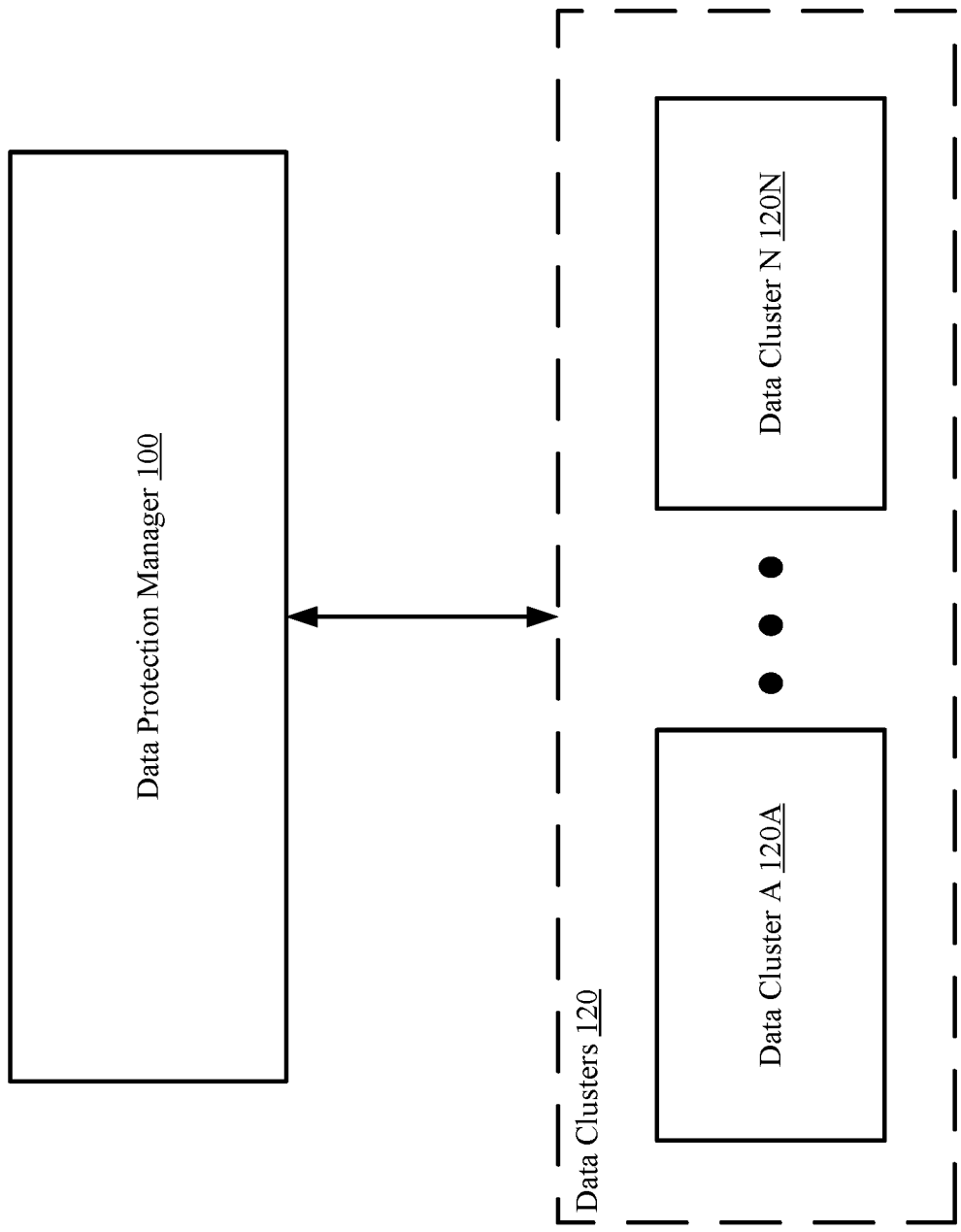

METHOD AND SYSTEM FOR MAPPING DATA PROTECTION POLICIES TO DATA CLUSTERS

BACKGROUND

Computing devices may provide services. To provide the services, the computing devices may include hardware components and software components. To provide the aforementioned services, the hardware and software components of the computing devices may generate data. The data may be relevant to users of the computing devices. The data may be protected to ensure availability to users of the computing devices.

SUMMARY

In general, in one aspect, the invention relates to a method for managing data protection services for data clusters in accordance with one or more embodiments of the invention. The method includes identifying, by a mapping module of a data protection manager, a first discovery event associated with a first data cluster; in response to identifying the first discovery event: obtaining first data cluster topology information associated with the first data cluster from the first data cluster; obtaining data cluster data protection information from a data cluster data protection information repository; mapping first protection policies to the first data cluster using the first data cluster topology information and the data cluster data protection information; updating data cluster topology information protection policy mappings using the using the first data cluster topology information and the data cluster data protection information; and initiating performance of first data protection services for the first data cluster based on the first mapped protection policies.

In general, in one aspect, the invention relates to a system for managing data protection services for data clusters in accordance with one or more embodiments of the invention. The system includes persistent storage, which stores data cluster topology protection policy mappings, and a mapping module of a data protection manager. The mapping module is programmed to identify a first discovery event associated with a first data cluster; in response to identifying the first discovery event: obtain first data cluster topology information associated with the first data cluster from the first data cluster; obtain data cluster data protection information from a data cluster data protection information repository; map first protection policies to the first data cluster using the first data cluster topology information and the data cluster data protection information; update data cluster topology information protection policy mappings using the using the first data cluster topology information and the data cluster data protection information; and initiate performance of first data protection services for the first data cluster based on the first mapped protection policies.

In general, in one aspect, the invention relates to a non-transitory computer readable medium which includes computer readable program code, which when executed by a computer processor enables the computer processor to perform a method for managing data protection services for data clusters in accordance with one or more embodiments of the invention. The method includes identifying, by a mapping module of a data protection manager, a first discovery event associated with a first data cluster; in response to identifying the first discovery event: obtaining first data cluster topology information associated with the first data cluster from the first data cluster; obtaining data cluster data protection information from a data cluster data protection information repository; mapping first protection policies to the first data cluster using the first data cluster topology information and the data cluster data protection information; updating data cluster topology information protection policy mappings using the using the first data cluster topology information and the data cluster data protection information; and initiating performance of first data protection services for the first data cluster based on the first mapped protection policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
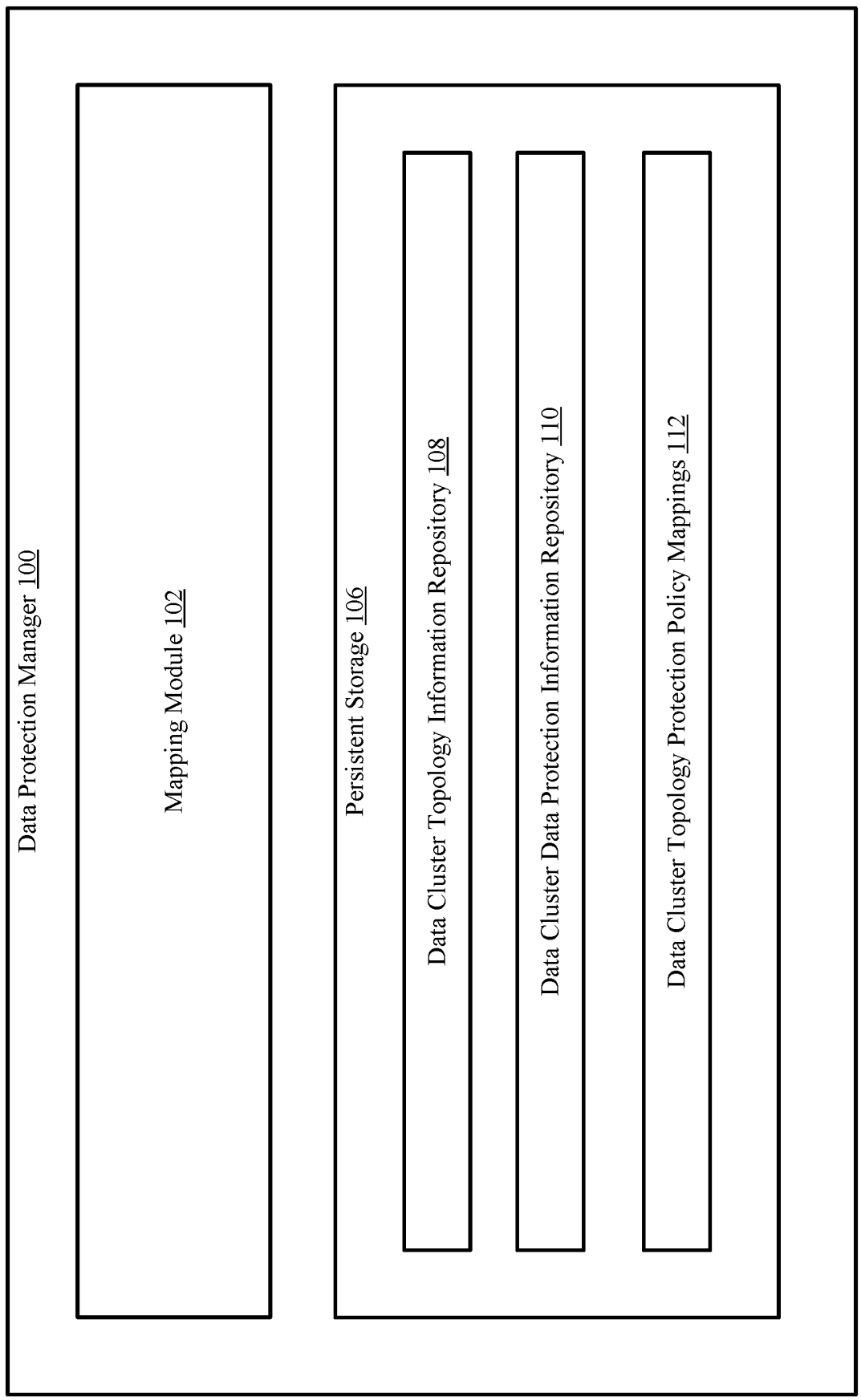
FIG. 1B shows a diagram of a data protection manager in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for managing data protection services for data clusters. More specifically, embodiments of the invention relate to a mapping module of a data protection manager that maps protection policies to data clusters based on data cluster topologies associated with the data clusters.

FIG. 1A shows a diagram of a system in accordance with one or more embodiments of the invention. The system may include a data protection manager (100) and data clusters (120). The system may include any number of data clusters (120) without departing from the invention. For example, the system may include data cluster A (120A) and data cluster N (120N). The system may include additional, fewer, and/or other components without departing from the invention. Each of the components in the system may be operatively connected via any combination of wireless and/or wired networks.

In one or more embodiments of the invention, the data protection manager (100) includes the functionality provide data protection services to the data clusters (120). The data protection manager (100) may include the functionality to provide and/or obtain other and/or additional services without departing from the invention. For additional information regarding the data protection manager (100) refer to FIG. 1B.

Figure 4:
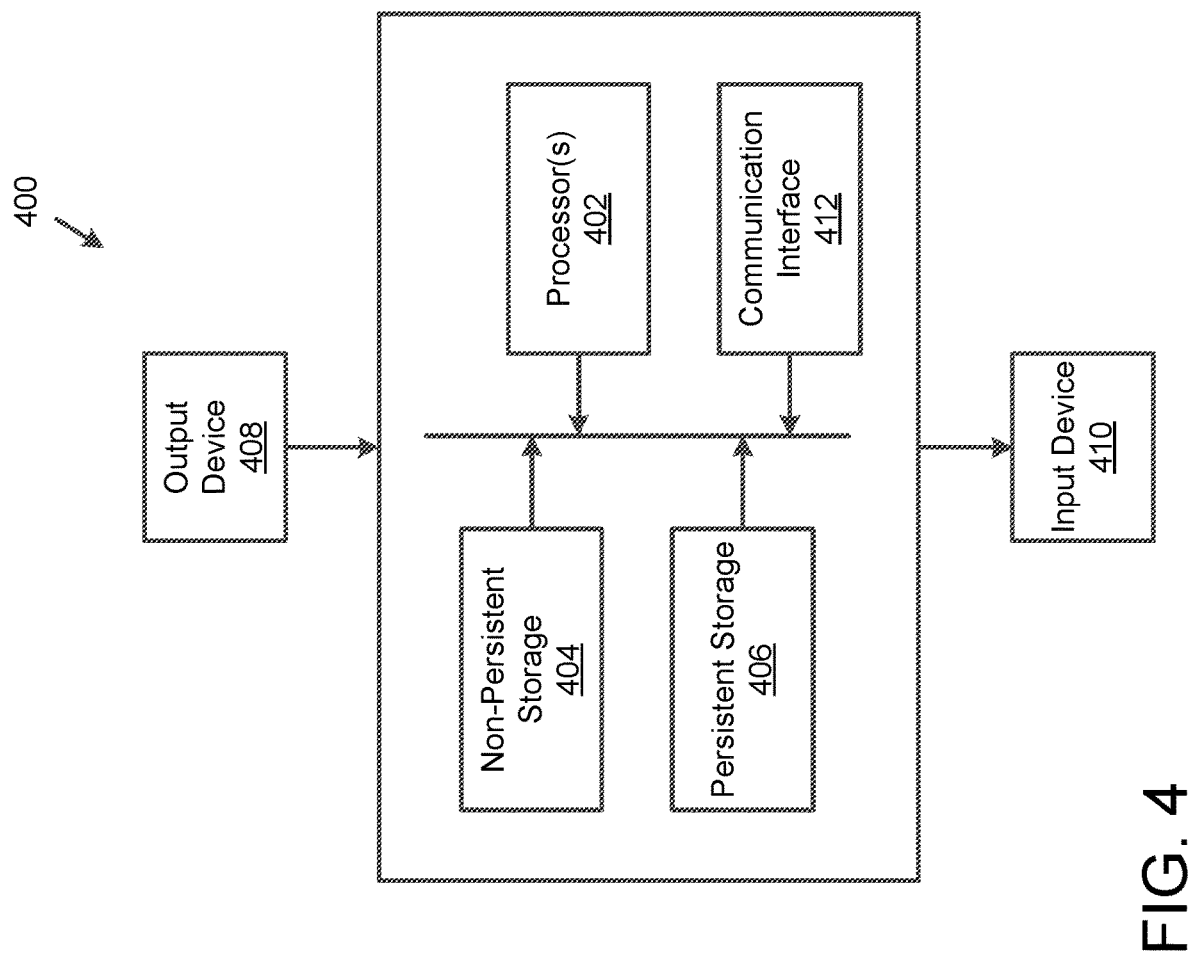
FIG. 4 shows a diagram of a computing device in accordance with one or more embodiments of the invention.

In one or more embodiments of the invention, the data protection manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (100) described throughout this application.

In one or more embodiments of the invention, the data protection manager (100) is implemented as a logical device. The logical device may utilize the computing resources of any number of computing devices and thereby provide the functionality of the data protection manager (100) described throughout this application.

In one or more embodiments of the invention, the data clusters (120) include the functionality to obtain data protection services from the data protection manager. The data clusters (120) may further include the functionality to perform computer implemented services for users of the data clusters (e.g., clients, not shown). The computer implemented services may include, for example, database services, electronic mail services, data processing services, etc. The computer implemented services may include other and/or additional types of services without departing from the invention.

In one or more embodiments of the invention, a data cluster (e.g., 120A) of the data clusters may be implemented as one or more computing devices (e.g., see above discussion). A data cluster (e.g., (120A)) may include any number of computing devices without departing from the invention. Each data cluster may include different numbers of computing devices, different quantity and types of computer resources, and may perform different computer implemented services without departing from the invention. For additional information regarding data clusters (120), refer to FIG. 1C.

FIG. 1B shows a diagram of a data protection manager in accordance with one or more embodiments of the invention. The data protection manager may be an embodiment of the data protection manager (100, FIG. 1A) discussed above. As discussed above, the data protection manager may perform data protection services for the data clusters (120, FIG. 1A). To perform the aforementioned data protection services, the data protection manager (100) may include a mapping module (102) and persistent storage (106). The data protection manager (100) may include other and/or additional components without departing from the invention. Each of the aforementioned components of the data protection manager (100) is discussed below.

In one or more embodiments of the invention, the mapping module (102) includes the functionality to perform a portion of the data protection services of the data protection manager (100). The portion of the data protection services performed by the mapping module (102) may include the methods depicted in FIGS. 2A-2B. The mapping module (102) may include the functionality to perform and or obtain other and/or additional services without departing from the invention.

In one or more embodiments of the invention, the mapping module (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the mapping module (102) described throughout this application.

In one or more embodiments of the invention, the mapping module (102) is implemented as computer instructions, e.g., computer code, stored on a persistent storage that when executed by a processor of the data protection manager (100) causes the data protection manager (100) to provide the functionality of the mapping module (102) described throughout this application.

In one or more embodiments of the invention, the persistent storage (106) stores data. The persistent storage (106) may include a data cluster topology information repository (108), a data cluster data protection information repository (110), and data cluster topology protection policy mappings (112). The persistent storage (106) may store other and/or additional data without departing from the invention. Each of the aforementioned types of data stored in the persistent storage (106) is discussed below.

The data cluster topology information repository (108) may be one or more data structures that include data cluster topology information associated with each of the data clusters (120, FIG. 1A). The data cluster topology information may include, for example, the software resources and/or hardware resources (e.g., GPUs, CPUs, storage devices, operating systems, etc.) associated with each of the data clusters (120, FIG. 1A), computing resource utilization associated with each of the data clusters, etc. The data cluster topology information repository may include other and/or additional types of information without departing from the invention.

The data cluster data protection information repository (110) may be one or more data structures that include data cluster topology types and protection policies associated with each data cluster topology type. A data cluster topology type may be an identifier associated with a particular configuration of data cluster components (e.g., GPUs, CPUs, storage devices, operating systems, virtual machines, etc.) and data cluster component types. The particular configurations of data cluster components may be included in the data cluster data protection information repository (110). Each data cluster topology type may be associated with different sets of one or more protection policies without departing from the invention. The protection policies associated with each data cluster topology type may be specified by a third party domain expert (e.g., a manufacturer, IT administrator, etc.) and include information and/or recommendations obtained directly from a third party domain expert of a data cluster topology (or data cluster component included in the data cluster topology) and/or is configured by a user of the data protection manager (100). The data cluster data protection information repository (110) may include other and/or additional information without departing from the invention.

The data cluster topology protection policy mappings (112) may include one or more data structures that specify the protection policies mapped to each data cluster topologies of the data clusters (120, FIG. 1A). The data cluster topology protection policy mappings (112) may include other and/or additional types of information without departing from the invention.

The persistent storage (106) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (106) may utilize portions of any combination of hard disk drives, solid state disk drives, tape drives, and/or any other physical storage medium of any number of computing devices.

Figure 1C:
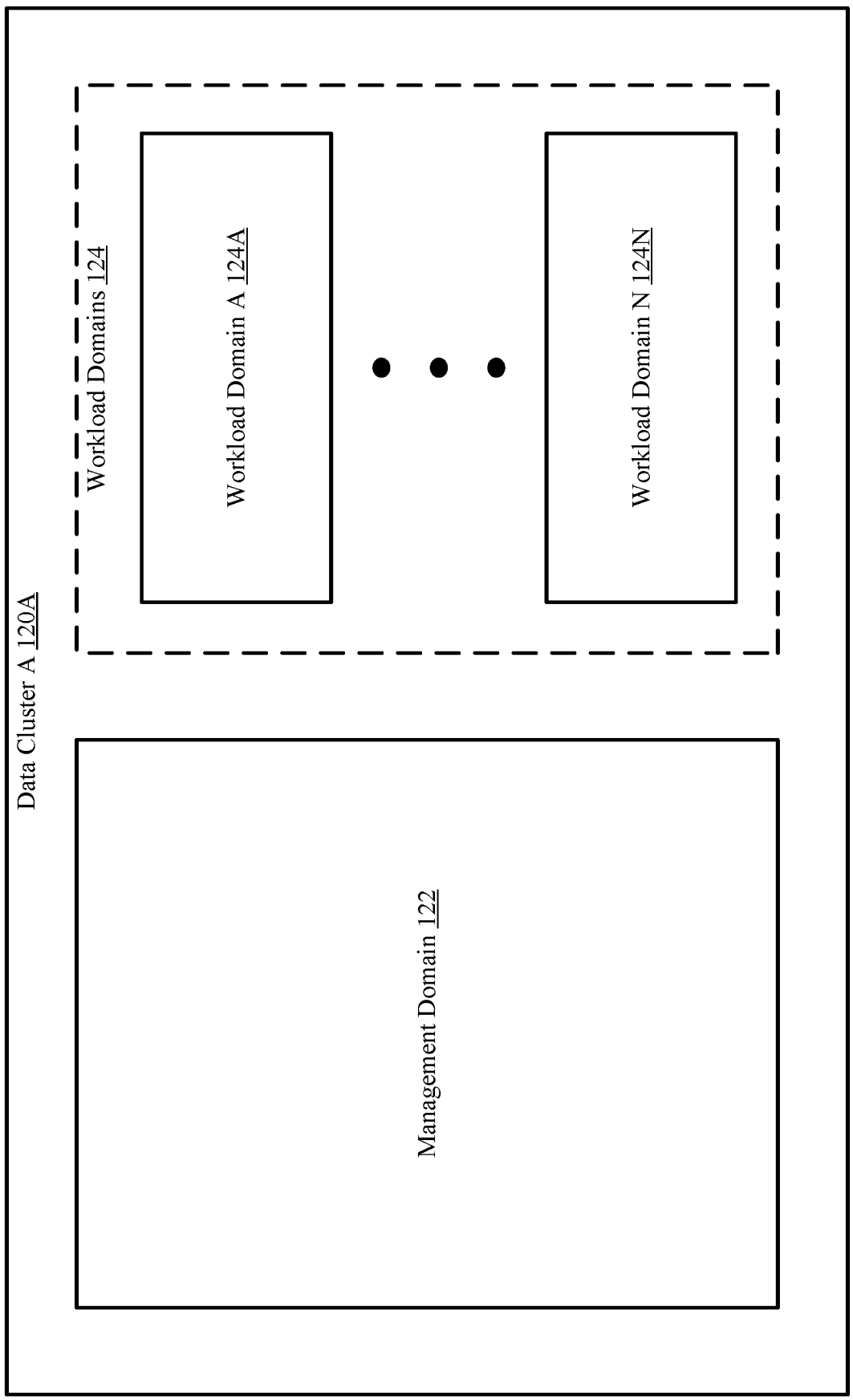
FIG. 1C shows a diagram of a data cluster in accordance with one or more embodiments of the invention.

FIG. 1C shows a diagram of a data cluster in accordance with one or more embodiments of the invention. The data cluster may be an embodiment of a data cluster (e.g., 120A, FIG. 1A) of the data clusters (120, FIG. 1A) discussed above. As discussed above, data cluster A (120A) may include the functionality to perform computer implemented services and obtain data protection services from the data protection manager (100, FIG. 1A). To obtain and perform the aforementioned services, data cluster A (120A) may include a management domain (122) and workload domains (124). Data cluster A (120A) may include any number of workload domains without departing from the invention. For example, data cluster A (120A) may include workload domain A (124A) and workload domain N (124N).

In one or more embodiments of the invention, the management domain (122) provides management services for data cluster A (120A). The management services may include generating information associated with data cluster A (120A) as a result of obtaining data protection services. The management domain (122) may perform and/or obtain other and/or additional services without departing from the invention. For additional information regarding the management domain (122) refer to FIG. 1D.

In one or more embodiments of the invention, the workload domains (124) obtain management services from the management domain (122), data protection services from the data protection manager (100, FIG. 1A), and perform computer implemented services for users. The workload domains (124) may perform and/or obtain other and/or additional services without departing from the invention. For additional information regarding the workload domains (124), refer to FIG. 1E.

Figure 1D:
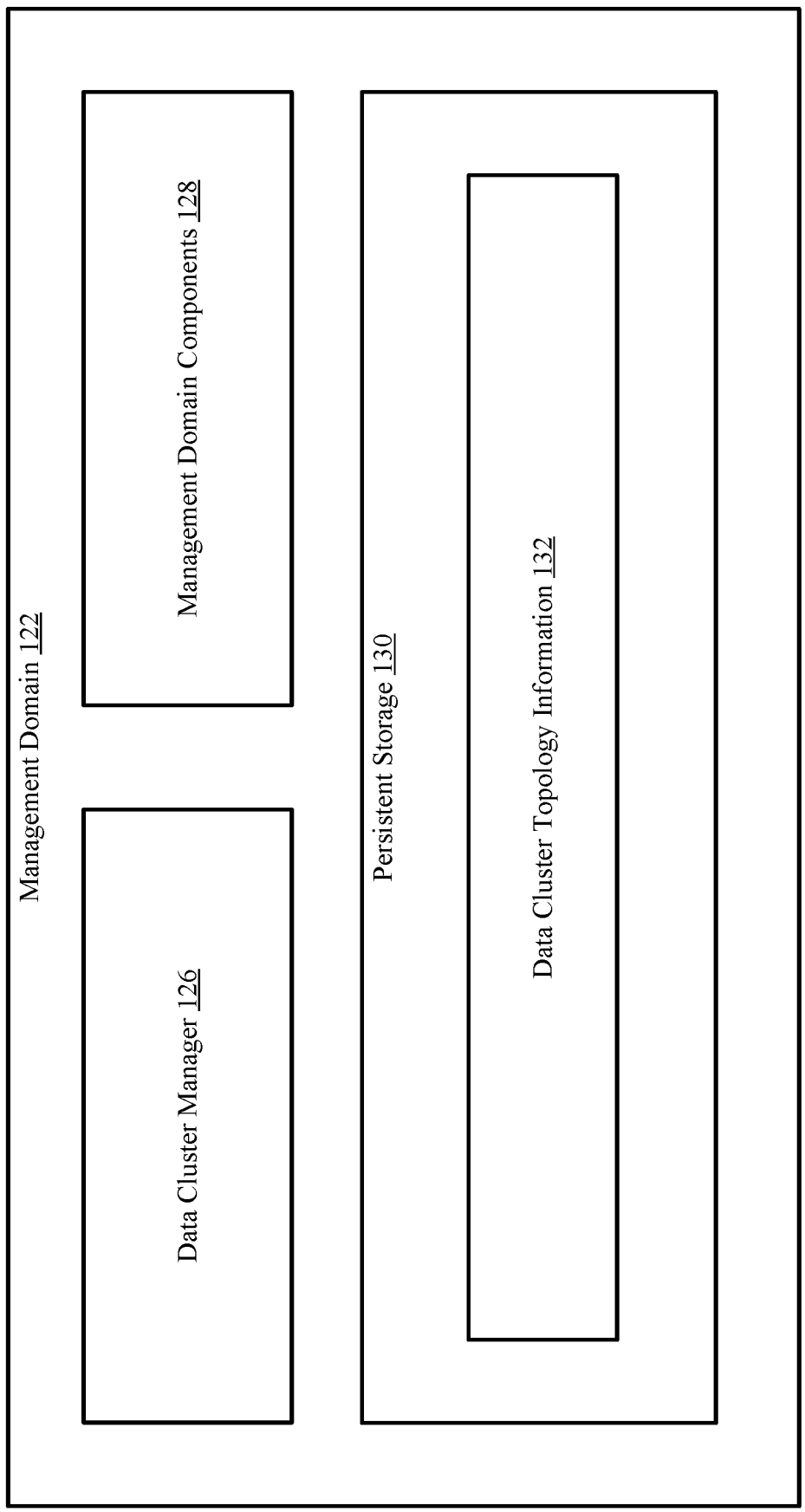
FIG. 1D shows a diagram of a management domain of a data cluster in accordance with one or more embodiments of the invention.

FIG. 1D shows a diagram of a management domain of a data cluster in accordance with one or more embodiments of the invention. The management domain (122) may be an embodiment of the management domain (122, FIG. 1C) discussed above. As discussed above, the management domain (122) provides management services for the workload domains (124, FIG. 1C). To perform the management services, the management domain (122) may include a data cluster manager (126), management domain components (128), and persistent storage (130). The management domain (122) may include other and/or additional components without departing from the invention.

In one or more embodiments of the invention, the data cluster manager (126) includes the functionality to perform the management services discussed above. The data cluster manager (126) may perform and/or provide other and/or additional services without departing from the invention.

In one or more embodiments of the invention, the data cluster manager (126) is implemented as a computing device (discussed above).

In one or more embodiments of the invention, the data cluster manager (126) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data cluster manager (126) described throughout this application.

In one or more embodiments of the invention, the data cluster manager (126) is implemented as computer instructions, e.g., computer code, stored on a persistent storage that when executed by a processor of data cluster A (120A, FIG. 1C) causes data cluster A (120A, FIG. 1C) to provide the functionality of the data cluster manager (126) described throughout this application.

In one or more embodiments of the invention, the management domain components (128) include hardware and software components of the one or more computing devices associated with data cluster A (120A, FIG. 1A) associated with the management domain (122). The hardware components may include, for example, central processing units, graphics processing units, storage devices, etc. The hardware components may include other and/or additional hardware components of computing devices without departing from the invention. The software components may include, for example, virtual machines, applications, operating systems, etc. The software components may include other and/or additional types of software components of computing devices without departing from the invention. The management domain components (128) may include a portion of the data cluster topology of data cluster A (120A).

The persistent storage (130) may be an embodiment of the persistent storage (106, FIG. 1B) discussed above. The persistent storage (130) may store data cluster topology information (132). The persistent storage (130) may store other and/or additional data without departing from the invention.

The data cluster topology information (132) may be an embodiment of the data cluster topology information associated with data cluster A (120A) discussed above with respect to the data cluster topology information repository (108, FIG. 1B).

Figure 1E:
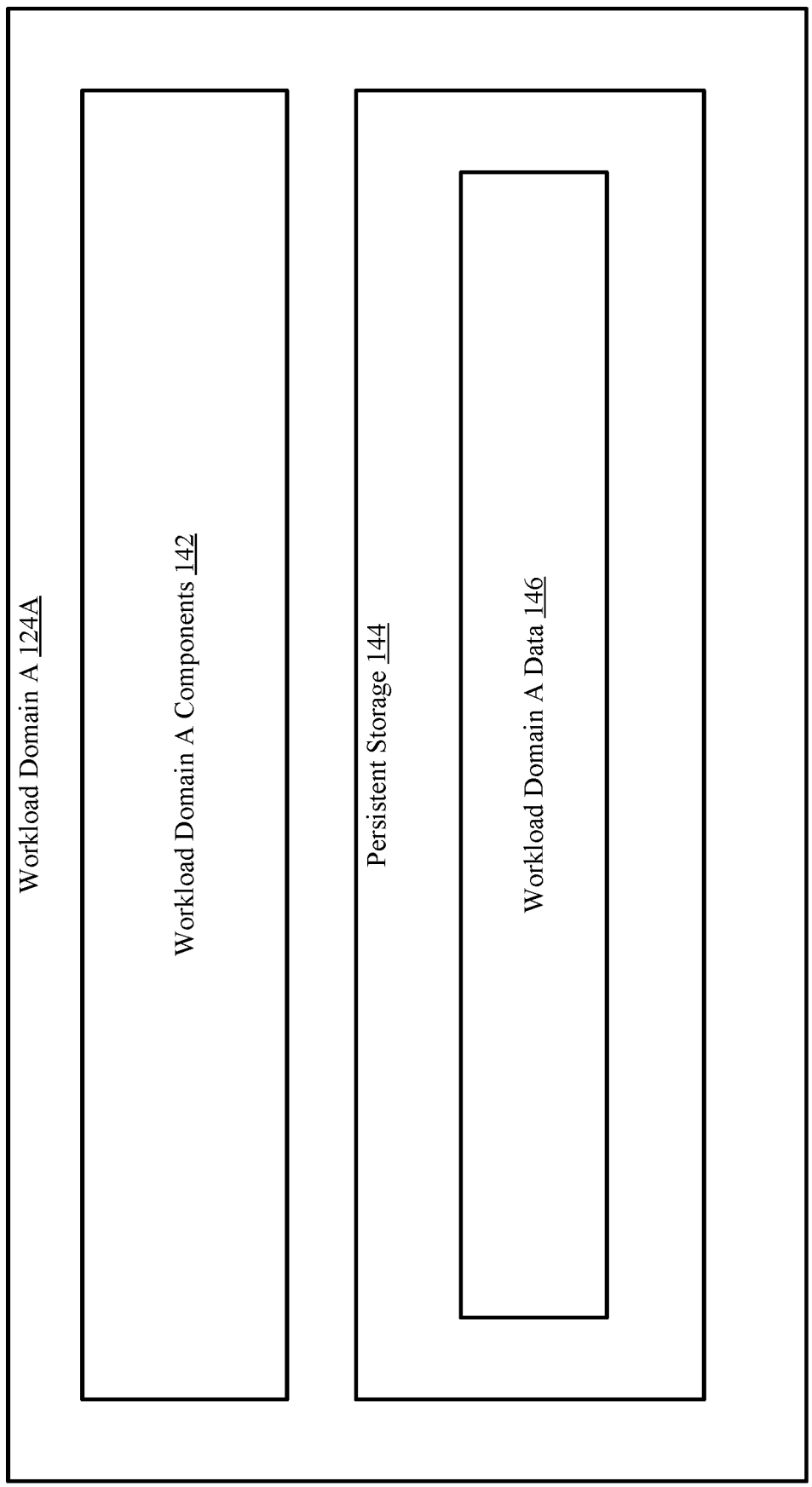
FIG. 1E shows a diagram of a workload domain of a data cluster in accordance with one or more embodiments of the invention.

FIG. 1E shows a diagram of a workload domain of a data cluster in accordance with one or more embodiments of the invention. Workload domain A (124A) may be an embodiment of a workload domain (e.g., 124A, FIG. 1C) discussed above. As discussed above, workload domain A (124) obtains management services and data protection services and provides computer implemented services for users. To perform and obtain the aforementioned services, workload domain A (124A) may include workload domain A components (142) and a persistent storage (144). Workload domain A (124A) may include other and/or additional components without departing from the invention.

In one or more embodiments of the invention, the workload domain A components (142) include hardware and software components of the one or more computing devices associated with data cluster A (120A, FIG. 1A) associated with workload domain A (124A). The hardware components may include, for example, central processing units, graphics processing units, storage devices, etc. The hardware components may include other and/or additional hardware components of computing devices without departing from the invention. The software components may include, for example, virtual machines, applications, operating systems, etc. The software components may include other and/or additional types of software components of computing devices without departing from the invention. The workload domain A components (142) may include a portion of the data cluster components of data cluster A (120A).

The persistent storage (144) may be an embodiment of the persistent storage (106, FIG. 1B) discussed above. The persistent storage (144) may store workload domain A data (146). The workload domain A data (146) may include one or more data structures that include data generated and/or used during the performance of computer implemented services by workload domain A (124A). The workload domain A data (146) may include, for example, database data, instant messaging data, etc. The workload domain A data (146) may include other and/or additional types of data without departing from the invention.

Figure 2A:
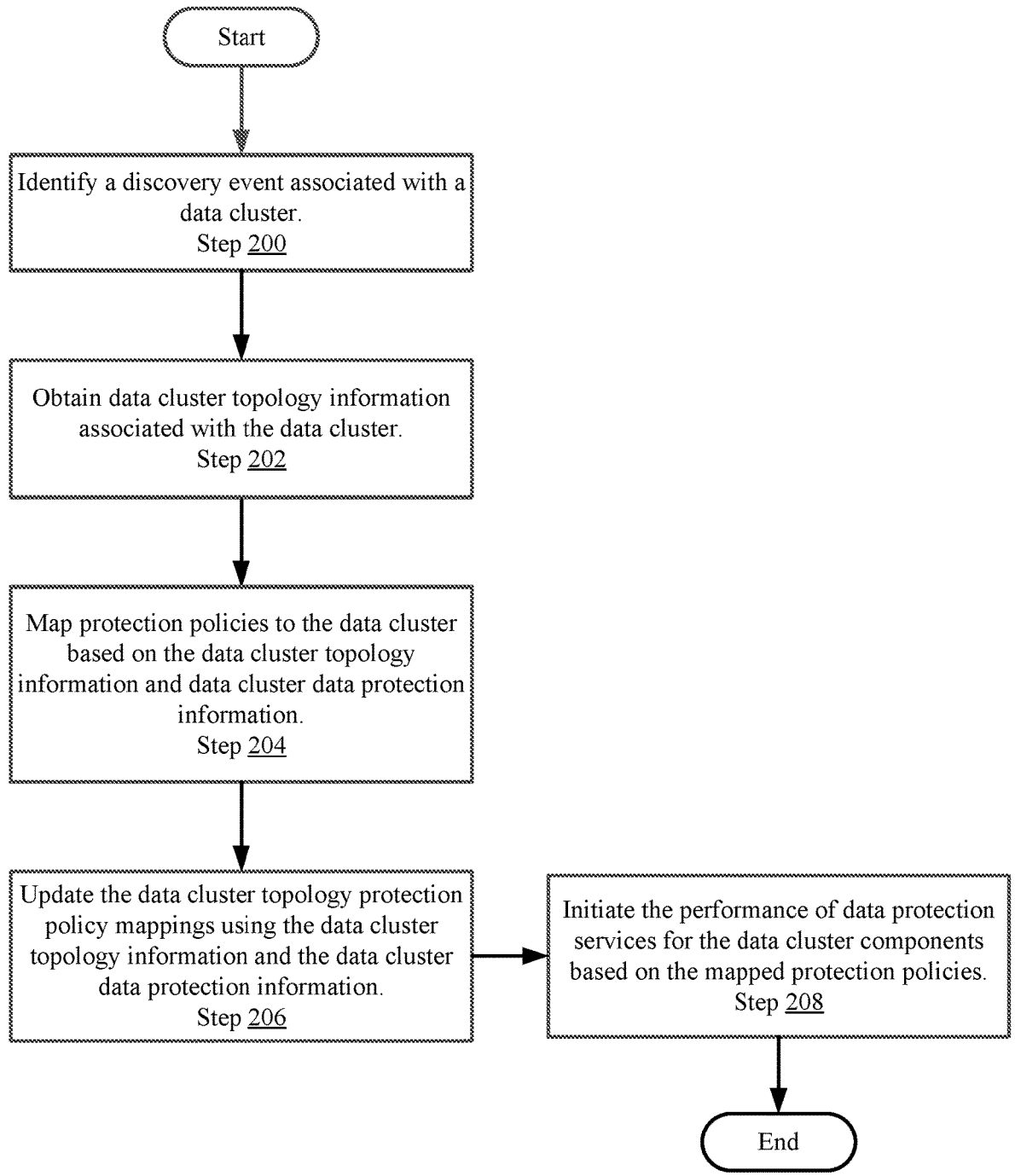
FIG. 2A shows a flowchart of a method for mapping protection policies to data cluster topology in accordance with one or more embodiments of the invention.

FIG. 2A shows a flowchart of a method for mapping protection policies to data cluster topologies in accordance with one or more embodiments of the invention. The method may be performed by, for example, a mapping module (102, FIG. 1B) of a data protection manager (100, FIG. 1A). Other components of the system illustrated in FIGS. 1A-1E may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a discovery event associated with a data cluster is identified.

In one or more embodiments of the invention, the mapping module is configured to perform periodic discoveries of data cluster components for data clusters that have registered with the data protection manager. The mapping module may monitor the amount of time that has passed since a previous discovery was performed for a data cluster. The mapping module may, after a configurable amount of time has passed since the last discovery of the data cluster was performed, perform a subsequent discovery of the data cluster components of the data cluster. The mapping module may identify the expiration of the configurable amount of time since the previous discovery was performed as the discovery event. The discovery event associated with the data cluster may be identified via other and/or additional methods without departing from the invention.

In one or more embodiments of the invention, a user of the data cluster and/or the data protection manager sends a message to the mapping module of the data protection manager. The message may include a request to perform a data cluster discovery. The message may include communication information. The communication information may include a data cluster identifier, a data cluster manager identifier, a data cluster manager network address, an SFTP server identifier, an SFTP server network address, and security information (e.g., security keys, encryption keys, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to perform a data cluster discovery as the discovery event. The discovery event associated with the data cluster may be identified via other and/or additional methods without departing from the invention.

In one or more embodiments of the invention, a data cluster manager of a data cluster sends a message to the mapping module of the data protection manager. The message may include a request to register the data cluster with the data protection manager. The message may include communication information. The communication information may include a data cluster identifier, a data cluster manager identifier, a data cluster manager network address, an SFTP server identifier, an SFTP server network address, and security information (e.g., a security key, an encryption key, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the registration request as the discovery event. The discovery event associated with the data cluster may be identified via other and/or additional methods without departing from the invention.

In step 202, data cluster topology information associated with the data cluster is obtained.

In one or more embodiments of the invention, a mapping module of the data protection manager sends a message to the data cluster manager of the data cluster associated with the initial discovery event. The message may include a request for data cluster topology information associated with the data cluster. The message may be sent using the communication information obtained in step 200. The message may include other and/or additional information without departing from the invention. The message may be transmitted to the data cluster manager using any appropriate method of data transmission (e.g., network packets, application programming interface (API) calls, etc.) without departing from the invention. The request for client topology information associated with the data cluster may be sent to the data cluster manager associated with the data cluster via other and/or additional methods without departing from the invention.

In one or more embodiments of the invention, the mapping module obtains a message from the data cluster manager of the data cluster. The message may include data cluster topology information associated with the data cluster. The message may include other and/or additional information without departing from the invention. In response to obtaining the request, the data cluster manager may generate and/or obtain the data cluster topology information. The message may be transmitted to the mapping module using any appropriate method of data transmission (e.g., network packets, application programming interface (API) calls, etc.) without departing from the invention. The data cluster topology information associated with the data cluster may be obtained from the data cluster manager via other and/or additional methods without departing from the invention.

In step 204, protection policies are mapped to the data cluster topology using data cluster topology information and data cluster data protection information.

In one or more embodiments of the invention, the mapping module uses the data cluster topology information and the data cluster data protection information associated with the data cluster topology type associated with the data cluster to map protection policies to the data cluster. The data cluster data protection information may include a list of data cluster topology types, the data cluster topology information associated with each of the data cluster topology types, and the list of one or more protection policies associated with each of the data cluster topology types. The mapping module may identify the data cluster topology type associated with the data cluster by comparing the data cluster topology information obtained in step 202 with the data cluster topology information associated with each type of data cluster topology included in the data cluster data protection information repository. The mapping module may identify the data cluster topology type associated with the data cluster as the data cluster topology type that is associated with data cluster topology information included in the data cluster data protection information repository that matches the data cluster topology information obtained in step 202. The mapping module may map the protection policies associated with the identified data cluster topology type of the data cluster to the data cluster.

The protection policies may be mapped to the data cluster using data cluster topology information and data cluster data protection information via other and/or additional methods without departing from the invention.

In step 206, the data cluster topology protection policy mappings are updated using the data cluster topology information and the data cluster data protection information.

In one or more embodiments of the invention, the data cluster topology protection policy mappings are updated using the data cluster topology information and the data cluster data protection information by including the data cluster identifier, the data cluster topology type, and the protection policies associated with the data cluster topology type. The mapping module may associate the data cluster identifier included in the data cluster topology information with both the data cluster topology type and the protection policies associated with the data cluster topology type (i.e., included in the data cluster data protection information) in the data cluster topology protection policy mappings. The mapping module may store the associated data cluster identifier, the data cluster topology type, and the protection policies in the data cluster topology protection policy mappings of the persistent storage of the data protection manager. The mapping module may include other and/or additional information associated with the data cluster and the mapped protection policies in the data cluster topology protection policy mappings without departing from the invention. The data cluster topology protection policy mappings may be updated using the data cluster topology information and the data cluster data protection information via other and/or additional methods without departing from the invention.

In step 208, the performance of data protection services for the data cluster is initiated based on the mapped protection policies.

In one or more embodiments of the invention, the mapping module initiates the performance of data protection services for the data cluster using the mapped protection policies. The protection policies may include one or more protection policies that specify data protection requirements for performing data protection services associated with the data cluster components included in the data cluster topology of the data cluster. The mapping module may initiate the performance of data protection services for each data cluster component of the data cluster topology that satisfy the data protection requirements. The mapping module may cancel and/or otherwise stop performing at least a portion of the data protection services associated with data cluster components that were removed from the data cluster if the discovery event is not associated with an initial discovery event.

The data protection services may include generating backups of data cluster components according to a schedule specified by the mapped protection policies, storing backups in storage locations specified by the mapped protection policies, and other and/or additional data protection services that satisfy data protection requirements specified by the mapped protection policy types without departing from the invention. The mapping module may initiate the performance of the data protection services by requesting the data protection manager to monitor the protection policies mapped to each data cluster component of the data cluster topology and to perform the data protection services specified by the mapped protection policies. As a result, the data protection manager may perform the data protection services. The performance of data protection services for the data cluster is initiated based on the mapped protection policies via other and/or additional methods without departing from the invention.

In one or more embodiments of the invention, the method ends following step 208.

Figure 2B:
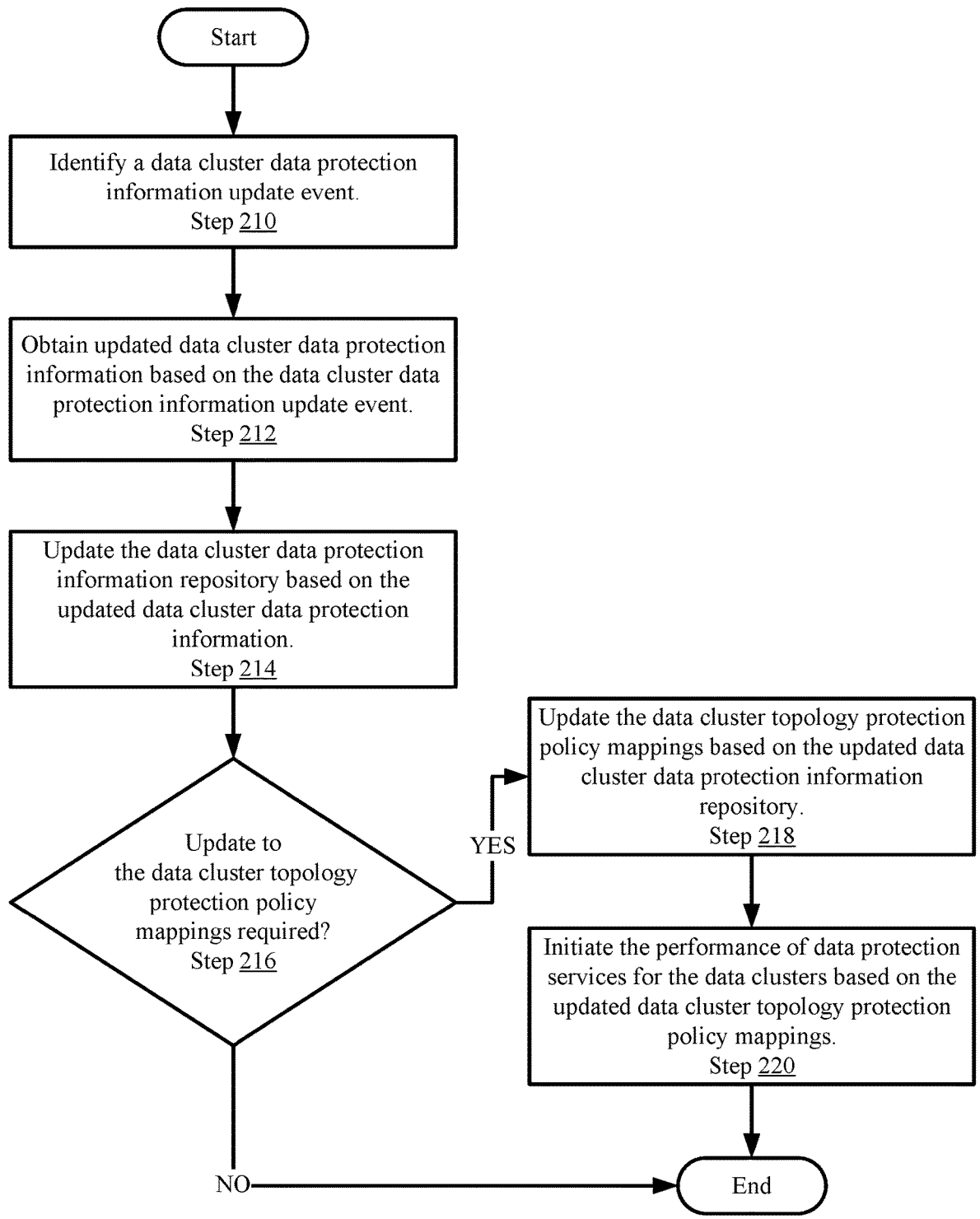
FIG. 2B shows a flowchart of a method for updating a data cluster data protection policy information repository in accordance with one or more embodiments of the invention.

FIG. 2B shows a flowchart of a method for data cluster data protection information in accordance with one or more embodiments of the invention. The method may be performed by, for example, a mapping module (102, FIG. 1B) of a data protection manager (100, FIG. 1A). Other components of the system illustrated in FIGS. 1A-1E may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 210, a data cluster data protection information update event is identified.

In one or more embodiments of the invention, a user of the data cluster and/or the data protection manager sends a message to the mapping module of the data protection manager. The message may include a request to update the data cluster data protection information repository. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to update the data cluster data protection information as the data cluster data protection information update event. The data cluster data protection information update event may be identified via other and/or additional methods without departing from the invention.

In one or more embodiments of the invention, an entity that manages protection policies (e.g., a third party domain expert or a protection policy manager, both not shown in the system of FIG. 1A) sends a message to the mapping module of the data protection manager. The message may include a request to update the data cluster data protection information repository. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to update the data cluster data protection information as the data cluster data protection information update event. The data cluster data protection information update event may be identified via other and/or additional methods without departing from the invention.

In step 212, updated data cluster data protection information is obtained based on the data cluster data protection information update event.

In one or more embodiments of the invention, the mapping module of the data protection manager sends a message to the user of the data cluster, the user of the data protection manager, the third party domain expert, and/or the protection policy management entity associated with the data cluster data protection information update event. The message may include a request for updated data cluster data protection information. The message may be transmitted by the mapping module using any appropriate method of data transmission (e.g., network packets, application programming interface (API) calls, etc.) without departing from the invention.

In response to obtaining the request from the mapping module, the user of the data cluster, the user of the data protection manager, the third party domain expert, and/or the protection policy management entity may generate and/or otherwise obtain updated data cluster data protection information. The new data cluster data protection information may include (i) one or more updated protection policies associated with one or more data cluster topology types, (ii) one or more new protection policies associated with one or more data cluster topology types, and/or additional information associated with data cluster data protection information without departing from the invention. The user of the data cluster, the user of the data protection manager, the third party domain expert, and/or the protection policy management entity may provide the updated data cluster data protection information to the mapping module. The message may be transmitted by the mapping module using any appropriate method of data transmission (e.g., network packets, application programming interface (API) calls, etc.) without departing from the invention. Updated data cluster data protection information may be obtained based on the data cluster data protection information update event via other and/or additional methods without departing from the invention.

In step 214, the data cluster data protection information repository is updated based on the updated data cluster data protection information.

In one or more embodiments of the invention, the mapping module stores the updated data cluster data protection information in the data cluster data protection information repository to update the data cluster data protection information. As discussed above, the updated data cluster data protection information may include new and/or modified protection policies associated with one or more data cluster topology types. The mapping module may overwrite the data cluster data protection information associated with data cluster topology types for which the updated data cluster topology data protection information is associated. The mapping module may overwrite all, or a portion, of the data cluster data protection information included in the data cluster data protection information repository to update the data cluster data protection information repository. In one embodiment of the invention, the mapping module may include new data cluster data protection information of the updated data cluster data protection information in the data cluster data protection information repository without overwriting any previous data cluster data protection information (e.g., a new data cluster topology type was included in the updated data cluster data protection information. The data cluster data protection information repository may be updated based on the updated data cluster data protection information via other and/or additional methods without departing from the invention.

In step 216, a determination is made as to whether an update to the data cluster topology protection policy mappings is required.

In one or more embodiments of the invention, the mapping module determines whether an update to the data cluster topology protection policy mappings is required using the updated data cluster data protection information and the data cluster topology protection policy mappings. To determine whether an update to the data cluster topology protection policy mappings is required, the mapping module may compare the protection policies associated with each data cluster topology type in the updated data cluster data protection information repository with the protection policies associated with each data cluster topology type included in the data cluster topology protection policy mappings. If the one or more protection policies associated with one or more data cluster topology types in the data cluster topology protection policy mappings do not match the protection policies associated with the same data cluster topology types in the updated data cluster data protection information repository, then the mapping module may determine that an update to the data cluster topology protection policy mappings is required. If all of the one or more protection policies associated with all of the one or more data cluster topology types in the data cluster topology protection policy mappings match the protection policies associated with the same data cluster topology types in the updated data cluster data protection information repository, then the mapping module may determine that an update to the data cluster topology protection policy mappings is not required. The determination as to whether an update to the data cluster topology protection policy mappings is required may be made via other and/or additional methods without departing from the invention.

In one or more embodiments of the invention, if it is determined that an update to the data cluster topology protection policy mappings is required, then the method proceeds to step 218. In one or more embodiments of the invention, if it is determined that an update to the data cluster topology protection policy mappings is not required, then the method ends following step 216.

In step 218, the data cluster topology protection policy mappings are updated based on the updated data cluster data protection information repository.

In one or more embodiments of the invention, the data cluster topology protection policy mappings are updated using the updated data cluster data protection information repository. The mapping module may update the protection policies in the data cluster topology protection policy mappings that do not match the protection policies associated with the same data cluster topology type in the updated data cluster data protection information repository with the protection policies included in the updated data cluster data protection information repository. As a result, the data cluster topology protection policy mappings include the new and/or updated protection policies included in the updated data cluster data protection information repository. The data cluster topology protection policy mappings are updated based on the updated data cluster data protection information repository via other and/or additional methods without departing from the invention.

In step 220, the performance of data protection services for the data clusters are initiated based on the updated data cluster topology protection policy mappings.

In one or more embodiments of the invention, the mapping module initiates the performance of data protection services for the data clusters using the updated mapped protection policies included in the updated data cluster topology protection policy mappings. The protection policies may include one or more protection policies that specify data protection requirements associated with the data cluster components included in the data cluster topology of the data cluster. The mapping module may initiate the performance of data protection services for each data cluster component of the data cluster topology that satisfy the data protection requirements. The mapping module may cancel and/or otherwise stop performing at least a portion of the data protection services associated with previous protection policies that were replaced in step 218.

The data protection services may include generating backups of data cluster components according to a schedule specified by the mapped protection policies, storing backups in storage locations specified by the mapped protection policies, and other and/or additional data protection services that satisfy data protection requirements specified by the mapped protection policy types without departing from the invention. The mapping module may initiate the performance of the data protection services by requesting the data protection manager to monitor the protection policies mapped to each data cluster component of the data cluster topology and to perform the data protection services specified by the mapped protection policies. As a result, the data protection manager may perform the data protection services. The performance of data protection services for the data cluster is initiated based on the mapped protection policies via other and/or additional methods without departing from the invention.

In one or more embodiments of the invention, the method ends following step 220.

Figure 3A:
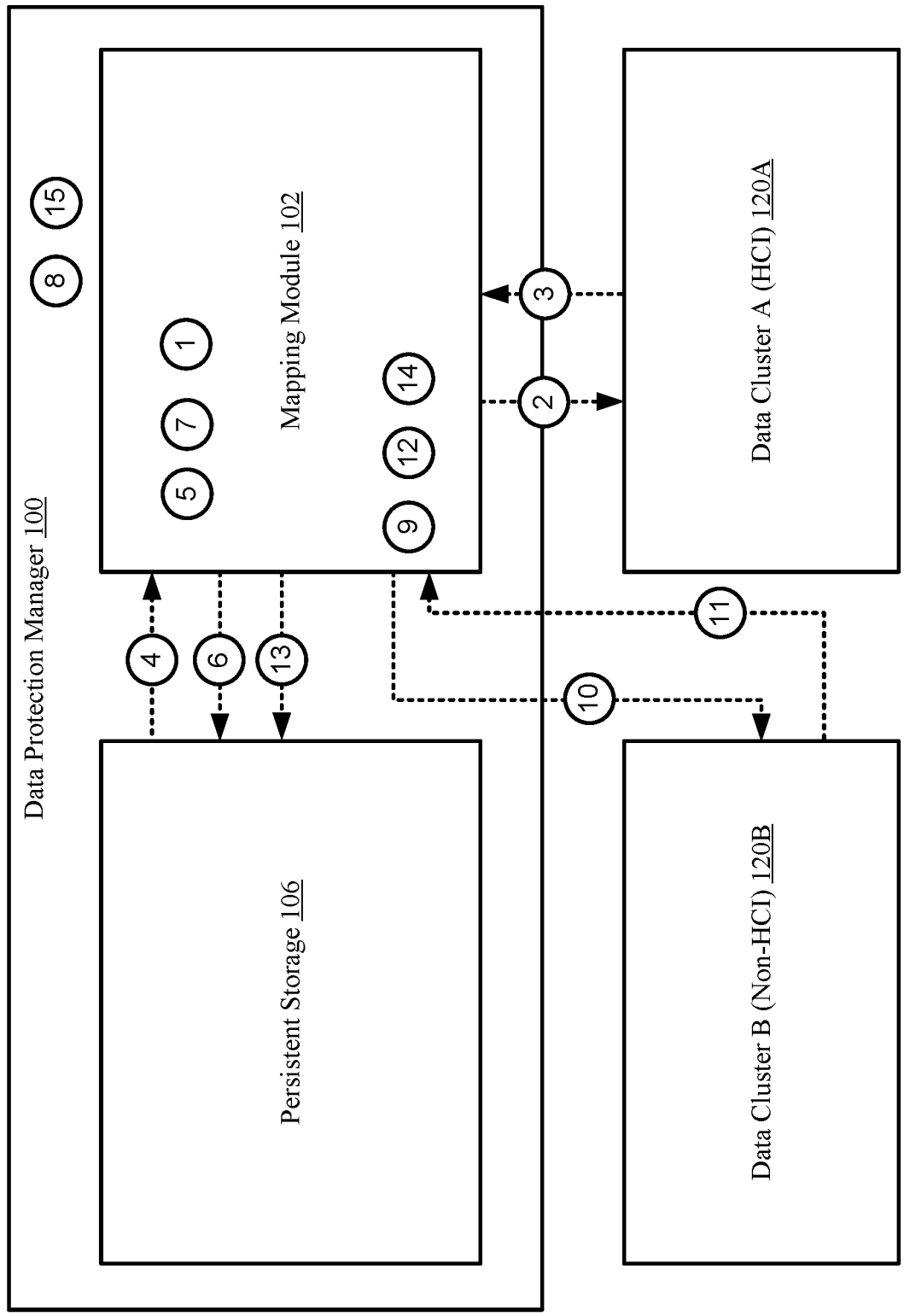
FIG. 3A shows a diagram of the operation of an example system over time in accordance with one or more embodiments of the invention.
Figure 3B:
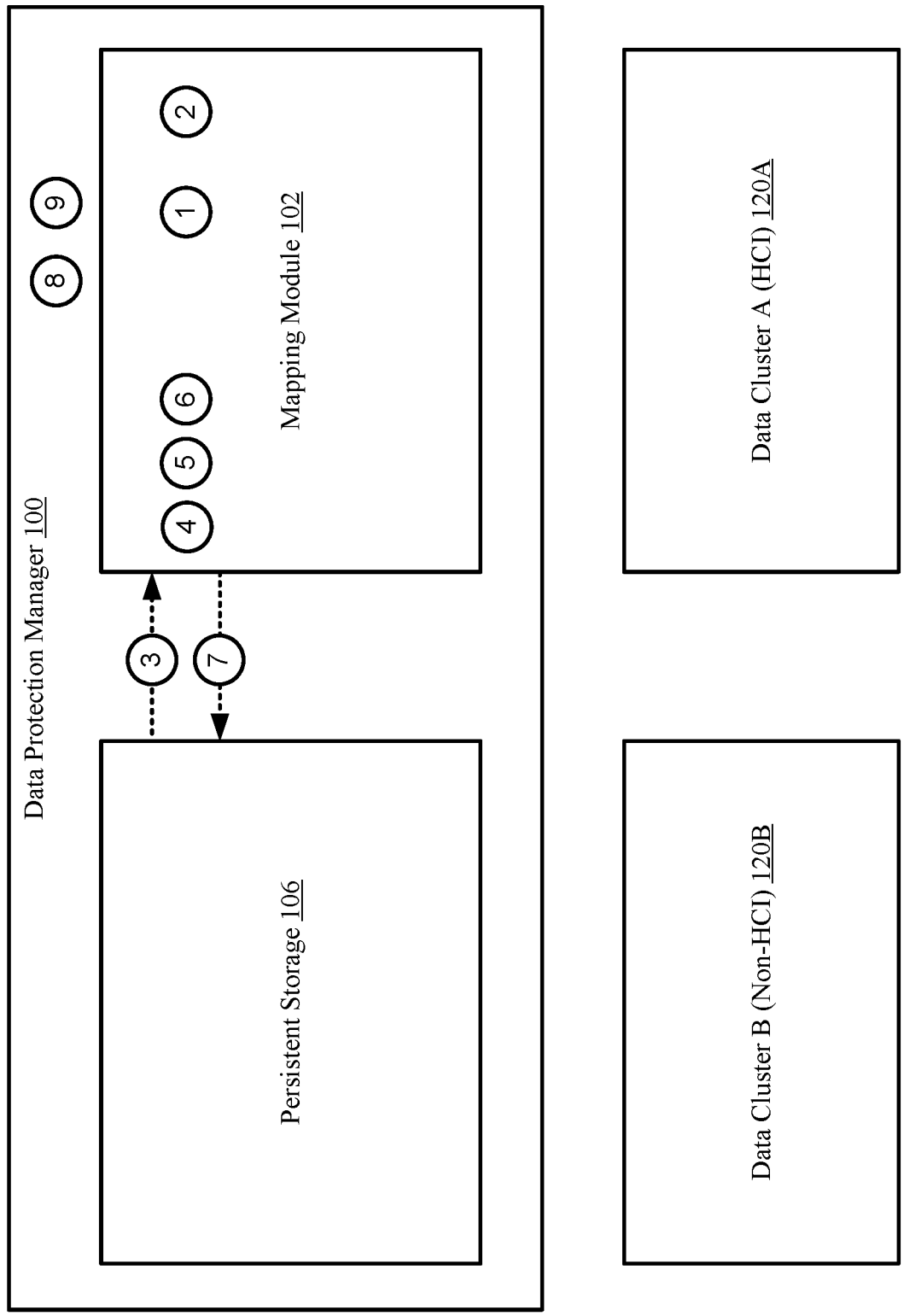
FIG. 3B shows a diagram of the continuation of the operation of the example system over time in accordance with one or more embodiments of the invention.

To further clarify embodiments of the invention, non-limiting examples are provided in FIGS. 3A-3B. FIGS. 3A-3B show diagrams of operations of example systems over time. FIGS. 3A-3B may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIGS. 3A-3B.

Examples

FIG. 3A shows a diagram of the operation of a first example system over time in accordance with one or more embodiments of the invention. Turning to FIG. 3A, consider a scenario in which data cluster A (120A) is provisioned and has just registered with a data protection manager (100). The data protection manager (100) includes a mapping module (102) and a persistent storage (106). At step 1, the mapping module (102) of the data protection manager (100) obtains a request to perform an initial discovery of the data cluster topology associated with data cluster A (120A). In response to obtaining the request to perform an initial discovery of data cluster topology, at step 2, the mapping module (102) sends a message to a data cluster manager (not shown) of data cluster A (120A). The message includes a request for the currently deployed data cluster topology of data cluster A (120A).

In response to obtaining the request, the data cluster manager generates and/or obtains data cluster topology information associated with data cluster A (120A). After generating and/or obtaining the data cluster topology information, at step 3, the data cluster manager sends the data cluster topology information to the mapping module (102). At step 4, the mapping module (102) obtains data cluster data protection information. At step 5, the mapping module uses the data cluster topology information and the data cluster data protection information to map protection policies to the data cluster topology of data cluster A (120A) resulting in data cluster topology protection policy mappings associated with data cluster A (120A).

The data cluster topology information specifies the data cluster topology currently deployed in data cluster A (120A). The data cluster data protection information specifies, for each type of data cluster topology, one or more protection policies recommended for the data cluster topology by a manufacturer of the data cluster topology of data cluster A (120A). The mapping module (102) then, at step 6, updates the data cluster topology information repository stored in the persistent storage (106) with the data cluster topology information associated with data cluster A (120A) and stores the data cluster topology protection policy mappings associated with data cluster A (120A) in the persistent storage (106). At step 7, the mapping module (102) initiates the performance of data protection services for the data cluster topology of data cluster A (120A) based on the data cluster topology protection policy mappings associated with data cluster A (120A). At step 8, the data protection manager (100) performs the data protection services for data cluster A (120A) based on the data cluster topology protection policy mappings associated with data cluster A (120A).

At step 9, the mapping module (102) of the data protection manager (100) obtains a request to perform an initial discovery of the data cluster topology associated with data cluster B (120B). In response to obtaining the request to perform an initial discovery of the data cluster topology, at step 10, the mapping module (102) sends a message to a data cluster manager (not shown) of data cluster B (120B). The message includes a request for the currently deployed data cluster topology of data cluster B (120B).

In response to obtaining the request, the data cluster manager generates and/or obtains data cluster topology information associated with data cluster B (120B). After generating and/or obtaining the data cluster topology information, at step 11, the data cluster manager sends the data cluster topology information to the mapping module (102). At step 12, the mapping module uses the data cluster topology information and the data cluster data protection information to map protection policies to the data cluster topology of data cluster B (120B) resulting in data cluster topology protection policy mappings associated with data cluster B (120B).

The data cluster topology of data cluster B (120B) (e.g., non-hyperconverged infrastructure (HCI)) is different than that of data cluster A (120A) (e.g., HCI). The data cluster topology information specifies the data cluster topology currently deployed in data cluster B (120B). The data cluster data protection information specifies, for each type of data cluster topology, one or more protection policies recommended for the data cluster topology by a manufacturer of the data cluster topology of data cluster B (120B). The mapped protection policies to data cluster B (120B) are different than the mapped protection policies to data cluster A (120A). The mapping module (102) then, at step 13, updates the data cluster topology information repository stored in the persistent storage (106) with the data cluster topology information associated with data cluster B (120B) and stores the data cluster topology protection policy mappings associated with data cluster B (120B) in the persistent storage (106). At step 14, the mapping module (102) initiates the performance of data protection services for the data cluster topology of data cluster B (120B) based on the data cluster topology protection policy mappings associated with data cluster B (120B). At step 15, the data protection manager (100) performs the data protection services for data cluster B (120B) based on the data cluster topology protection policy mappings associated with data cluster B (120B).

FIG. 3B shows a diagram of the continuation of the operation of the example system over time in accordance with one or more embodiments of the invention. Turning to FIG. 3B, at some point in time after step 15 of FIG. 3A, at step 1, the mapping module (102) of the data protection manager (100) identifies a data cluster data protection information update event. In response to identifying the data cluster data protection information update event, at step 2, the mapping module (102) obtains updated data cluster data protection information based on the data cluster data protection information update event. At step 3, the mapping module (102) obtains the previous data cluster data protection information from the data cluster data protection information repository of the persistent storage (106).

After obtaining the previous data cluster data protection information, at step 4, the mapping module updates the previous data cluster data protection information using the updated data cluster data protection information. At step 5, the mapping module (102) determines that the updated data cluster data protection information requires an update to both the mapped protection policies for data cluster A (120A) and data cluster B (120B). At step 6, the mapping module (102) uses the updated data cluster data protection information to update the data cluster topology protection policy mappings associated with data cluster A (120A) and data cluster B (120B).

At step 7, the mapping module stores the updated data cluster topology protection policy mappings associated with data cluster A (120A) and data cluster B (120B) in persistent storage (106). Additionally, the mapping module stores the updated data cluster data protection information in the data cluster data protection information repository in the persistent storage (106). At step 8, the data protection manager (100) performs the data protection services for data cluster A (120A) based on the updated data cluster topology protection policy mappings associated with data cluster A (120A). At step 9, the data protection manager (100) performs the data protection services for data cluster B (120B) based on the updated data cluster topology protection policy mappings associated with data cluster B (120B).

End of Examples

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to a mapping module of a data protection manager that assigns protection policies to data clusters based on data cluster topologies associated with the data clusters. To map data protection services, the mapping module may obtain data cluster topology information associated with a data cluster which may specify the data cluster type associated with the data cluster. The mapping module may use the data cluster topology information and data cluster data protection information to map the protection polices to the data cluster topology. Therefore, protection policies and data protection services may be efficiently mapped to the entirety of the data cluster topology while mitigating user involvement.

Thus, embodiments of the invention may address the problem of inefficient use of computing resources to map protection policies to data clusters. This problem arises due to the nature of the technological environment in which the data cluster operate.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data protection services for data clusters, the method comprising:
   identifying, by a mapping module of a data protection manager, a first discovery event associated with a first data cluster;
   in response to identifying the first discovery event:
   obtaining first data cluster topology information associated with the first data cluster from the first data cluster, wherein the first data cluster topology information specifies a first data cluster topology comprising:
   software resources of the first data cluster comprising an operating system, an application, and a virtual machine associated with the first data cluster, and
   hardware resources of the first data cluster comprising a central processing unit, a graphics processing unit, and a storage device;
   obtaining data cluster data protection information from a data cluster data protection information repository, wherein the data cluster data protection information specifies:
   a first data cluster topology type associated with the software resources and the hardware resources of the first data cluster topology, and
   first protection policies associated with the first data cluster topology type;
   mapping first protection policies to the first data cluster using the first data cluster topology information and the data cluster data protection information;
   updating data cluster topology information protection policy mappings using the first data cluster topology information and the data cluster data protection information; and
   initiating performance of first data protection services for the first data cluster based on the first mapped protection policies.

2. The method of claim 1, further comprising:
   identifying a second discovery event associated with a second data cluster;
   in response to identifying the second discovery event:
   obtaining second data cluster topology information associated with the second data cluster from the second data cluster;
   mapping second protection policies to the second data cluster using the second data cluster topology information and the data cluster data protection information;
   updating data cluster topology information protection policy mappings using the second data cluster topology information and the data cluster data protection information; and
   initiating performance of second data protection services for the second data cluster based on the second mapped protection policies.

3. The method of claim 2, wherein:
   the second data cluster topology information specifies a second data cluster topology associated with the second data cluster, wherein the second data cluster topology is associated with a second data cluster topology type.

4. The method of claim 3, wherein the data cluster data protection information specifies:
   the second protection policies are associated with the second data cluster topology type.

5. The method of claim 4, wherein the data cluster data protection information is configured based on recommendations by third party domain experts of the first data cluster and the second data cluster.

6. The method of claim 4, wherein the data cluster data protection information is configured by a user of the first data cluster and a user of the second data cluster.

7. The method of claim 2, further comprising:
   prior to initiating the performance of the second data protection services for the second data cluster based on the second mapped protection policies:
   identifying a data cluster data protection information update event;
   in response to identifying the data cluster data protection information update event:
   obtaining updated data cluster data protection information based on the data cluster data protection information update event;
   updating the data cluster data protection information repository based on the updated data cluster data protection information to obtain an updated data cluster data protection information repository;

making a determination that updates to the data cluster topology protection policy mappings are required; and in response to the determination:

updating the data cluster topology protection policy mappings based on the updated data cluster data protection information repository to obtain updated first mapped protection policies and updated second mapped protection policies; and initiate the performance of the first data protection services and the second data protection services based on the updated first mapped protection policies and the updated second mapped protection policies.

8. A non-transitory computer readable medium comprising computer readable program code, which when executed by a computer processor enables the computer processor to perform a method for managing data protection services for data clusters, the method comprising:

identifying, by a mapping module of a data protection manager, a first discovery event associated with a first data cluster;

in response to identifying the first discovery event:

obtaining first data cluster topology information associated with the first data cluster from the first data cluster, wherein the first data cluster topology information specifies a first data cluster topology comprising:

software resources of the first data cluster comprising an operating system, an application, and a virtual machine associated with the first data cluster, and hardware resources of the first data cluster comprising a central processing unit, a graphics processing unit, and a storage device;

obtaining data cluster data protection information from a data cluster data protection information repository, wherein the data cluster data protection information specifies:

a first data cluster topology type associated with the software resources and the hardware resources of the first data cluster topology, and first protection policies associated with the first data cluster topology type;

mapping first protection policies to the first data cluster using the first data cluster topology information and the data cluster data protection information;

updating data cluster topology information protection policy mappings using the first data cluster topology information and the data cluster data protection information; and initiating performance of first data protection services for the first data cluster based on the first mapped protection policies.

9. The non-transitory computer readable medium of claim 8, further comprising:

identifying a second discovery event associated with a second data cluster;

in response to identifying the second discovery event:

obtaining second data cluster topology information associated with the second data cluster from the second data cluster;

mapping second protection policies to the second data cluster using the second data cluster topology information and the data cluster data protection information;

updating data cluster topology information protection policy mappings using the second data cluster topology information and the data cluster data protection information; and initiating performance of second data protection services for the second data cluster based on the second mapped protection policies.

10. The non-transitory computer readable medium of claim 9, wherein:

the second data cluster topology information specifies a second data cluster topology associated with the second data cluster, wherein the second data cluster topology is associated with a second data cluster topology type.

11. The non-transitory computer readable medium of claim 10, wherein the data cluster data protection information specifies:

the second protection policies are associated with the second data cluster topology type.

12. The non-transitory computer readable medium of claim 11, wherein the data cluster data protection information is configured based on recommendations by third party domain experts of the first data cluster and the second data cluster.

13. The non-transitory computer readable medium of claim 11, wherein the data cluster data protection information is configured by a user of the first data cluster and a user of the second data cluster.

14. The non-transitory computer readable medium of claim 9, further comprising:

prior to initiating the performance of the second data protection services for the second data cluster based on the second mapped protection policies: identifying a data cluster data protection information update event;

in response to identifying the data cluster data protection information update event:

obtaining updated data cluster data protection information based on the data cluster data protection information update event;

updating the data cluster data protection information repository based on the updated data cluster data protection information to obtain an updated data cluster data protection information repository;

making a determination that updates to the data cluster topology protection policy mappings are required; and in response to the determination:

updating the data cluster topology protection policy mappings based on the updated data cluster data protection information repository to obtain updated first mapped protection policies and updated second mapped protection policies; and initiate the performance of the first data protection services and the second data protection services based on the updated first mapped protection policies and the updated second mapped protection policies.

15. A system for managing data protection services for data clusters, comprising:

persistent storage for storing a data cluster topology protection policy mappings; and a mapping module of a data protection manager, comprising a processor and memory, programmed to:

identify a first discovery event associated with a first data cluster;

in response to identifying the first discovery event:
- obtain first data cluster topology information associated with the first data cluster from the first data cluster, wherein the first data cluster topology information specifies a first data cluster topology comprising:
  - software resources of the first data cluster comprising an operating system, an application, and a virtual machine associated with the first data cluster, and
  - hardware resources of the first data cluster comprising a central processing unit, a graphics processing unit, and a storage device;
- obtain data cluster data protection information from a data cluster data protection information repository, wherein the data cluster data protection information specifies:
  - a first data cluster topology type associated with the software resources and the hardware resources of the first data cluster topology, and
  - first protection policies associated with the first data cluster topology type;
- map first protection policies to the first data cluster using the first data cluster topology information and the data cluster data protection information;
- update data cluster topology information protection policy mappings using the first data cluster topology information and the data cluster data protection information; and
- initiate performance of first data protection services for the first data cluster based on the first mapped protection policies.

16. The system of claim 15, wherein the mapping module if further programmed to:

identify a second discovery event associated with a second data cluster;

in response to identifying the second discovery event:
- obtain second data cluster topology information associated with the second data cluster from the second data cluster;
- map second protection policies to the second data cluster using the second data cluster topology information and the data cluster data protection information;
- update data cluster topology information protection policy mappings using the second data cluster topology information and the data cluster data protection information; and
- initiate performance of second data protection services for the second data cluster based on the second mapped protection policies.

17. The system of claim 16, wherein:
the second data cluster topology information specifies a second data cluster topology associated with the second data cluster, wherein the second data cluster topology is associated with a second data cluster topology type.

18. The system of claim 17, wherein the data cluster data protection information specifies:
the second protection policies are associated with the second data cluster topology type.

19. The system of claim 18, wherein the data cluster data protection information is configured based on recommendations by third party domain experts of the first data cluster and the second data cluster.

20. The system of claim 18, wherein the data cluster data protection information is configured by a user of the first data cluster and a user of the second data cluster.

* * * * *